(12) United States Patent
Lai et al.

(10) Patent No.: US 7,124,214 B2
(45) Date of Patent: Oct. 17, 2006

(54) METHOD AND RELATED APPARATUS FOR CONTROLLING A PERIPHERAL DEVICE TO TRANSFER DATA TO A BUS

(75) Inventors: Jiin Lai, Taipei Hsien (TW); Chad Tsai, Taipei Hsien (TW); Ju Zhang, Taipei Hsien (TW); Andrew Chuang, Taipei Hsien (TW); Andrew Su, Taipei Hsien (TW)

(73) Assignee: VIA Technologies Inc., Taipei Hsien (TW)

(*) Notice: Subject to any disclaimer, the term of this patent is extended or adjusted under 35 U.S.C. 154(b) by 359 days.

(21) Appl. No.: 10/707,806

(22) Filed: Jan. 14, 2004

(65) Prior Publication Data
US 2004/0193750 A1 Sep. 30, 2004

Related U.S. Application Data

(60) Provisional application No. 60/458,011, filed on Mar. 28, 2003.

(51) Int. Cl.
*G06F 3/00* (2006.01)
(52) U.S. Cl. .......................... 710/53; 710/52
(58) Field of Classification Search ............ 710/52, 710/53, 57
See application file for complete search history.

(56) References Cited

U.S. PATENT DOCUMENTS

| 5,521,928 | A | * | 5/1996 | Worsley et al. | 370/362 |
| 6,529,989 | B1 | * | 3/2003 | Bashford et al. | 710/306 |
| 2002/0138697 | A1 | * | 9/2002 | Kanda | 711/114 |
| 2003/0079059 | A1 | * | 4/2003 | Tsai | 710/1 |

* cited by examiner

*Primary Examiner*—Fritz Fleming
*Assistant Examiner*—David E. Martinez
(74) *Attorney, Agent, or Firm*—Winston Hsu

(57) ABSTRACT

A method and related apparatus used for controlling a peripheral device to transfer data to a bus. The peripheral device has a bus interface circuit and a controller. The method includes storing data outputted from the controller into a first storage block of the bus interface circuit, utilizing the bus interface circuit to simultaneously control the first storage block to output its stored data to the bus and control a second storage block of the bus interface circuit to store data outputted from the controller, and utilizing the bus interface circuit to control the second storage block to output its stored data to the bus.

13 Claims, 4 Drawing Sheets

METHOD AND RELATED APPARATUS FOR CONTROLLING A PERIPHERAL DEVICE TO TRANSFER DATA TO A BUS

CROSS REFERENCE TO RELATED APPLICATIONS

The application claims the benefit of U.S. Provisional Application No. 60/458,011, which was filed on Mar. 28, 2003 and is entitled "METHOD FOR CONTROLLING A PERIPHERAL DEVICE TO OUTPUT DATA THROUGH A BUS".

BACKGROUND OF INVENTION

1. Field of the Invention

The present invention relates to a method and a related apparatus for controlling data transmission. In particular, the present invention discloses a method and a related apparatus for controlling a peripheral device to transfer data to a bus.

2. Description of the Prior Art

Generally speaking, a computer system has a plurality of electronic components. In addition, the computer system also has many buses used for delivering data outputted from one electronic component to other electronic components. In other words, the buses establish connections among the electronic components installed on the computer system. Please refer to FIG. 1, which is a diagram of a prior art computer system 10. The computer system 10 comprises a central processing unit (CPU) 12, a north bridge circuit 14, a south bridge circuit 16, a PCI bus 18, a display controller 20, a memory 22, a small computer system interface (SCSI) controller 24, a hard-disk drive 26, a network controller 28, and an audio controller 30. The CPU 12 is used for controlling overall operations of the computer system 10. The north bridge circuit 14 is used for arbitrating signal transmission between high-speed peripheral devices (the display controller 20 and the memory 22 for example) and the CPU 12. However, the south bridge circuit 16 is used for arbitrating signal transmission between low-speed peripheral devices (the hard-disk drive 26, the network controller 28, and the audio controller 30 for example) and the north bridge circuit 14. As mentioned above, the PCI bus 18 on the computer system 10 is used for establishing connections among peripheral devices.

The display controller 20 is used for driving an external display device such as a monitor through video signals. The memory 22 is a volatile storage device for storing volatile data. The SCSI controller 24 functions as a bridge used for controlling signal transmission between the PCI bus 18 and a device (the hard-disk drive 26 for instance) connected to the SCSI controller 24. It is well-known that the hard-disk drive 26 is a non-volatile storage device for storing non-volatile data. The network controller 28 such as a network interface card (NIC) is used for controlling data transmission between the computer system 10 and an external network. The audio controller 30 such as an audio card is used for performing signal conversion between digital audio signals and analog audio signals. That is, the audio controller 30 is capable of converting digital audio signals into corresponding analog audio signals for driving a speaker, and is also capable of converting analog audio signals inputted by a microphone into corresponding digital audio signals.

As mentioned above, the peripheral devices such as the network controller 28, the audio controller 30, and the hard-disk drive 26 have to utilize the PCI bus 18 to transfer data to the memory 22 or the CPU 12 through the north bridge circuit 14 and the south bridge circuit 16. Therefore, how to efficiently utilize the PCI bus 18 to deliver massive data has become an important issue.

SUMMARY OF INVENTION

This invention provides a method and a related apparatus for controlling a peripheral device to transfer data to a bus.

Briefly summarized, the preferred embodiment of the present invention provides a method of controlling data outputted from a peripheral device. The peripheral device is installed on a computer system, and the peripheral device comprises a bus interface circuit and a controller. The bus interface circuit is electrically connected to a bus of the computer system for controlling data transmission between the peripheral device and the bus, and the controller is electrically connected to the bus interface circuit. The method includes positioning at least a first storage block and a second storage block in the bus interface circuit, storing data outputted from the controller in the first storage block, utilizing the bus interface circuit for simultaneously controlling the first storage block to transfer data within the first storage block to the bus and controlling the second storage block to store data outputted from the controller, and utilizing the bus interface circuit to control the second storage block to transfer data within the second storage block to the bus.

It is an advantage of the present invention that a plurality of buffers are alternatively used for storing source data waiting to be delivered to a target device. A data transfer rate between a controller and a bus interface circuit cannot be less than a data transfer rate between the bus interface circuit and an external bus. Therefore, before all of the source data are completely transferred to the external bus, the claimed peripheral device is capable of continuously occupying the external bus without entering a waiting state. In addition, the implemented buffer of the claimed peripheral device has a small capacity. Therefore, the production cost of the buffers is reduced, and the chip size of the bus interface circuit is greatly shrunk. Moreover, the data transfer efficiency is also improved because the claimed peripheral device is blocked from entering the waiting state.

These and other objectives of the present invention will no doubt become obvious to those of ordinary skill in the art after reading the following detailed description of the preferred embodiment, which is illustrated in the various figures and drawings.

DETAILED DESCRIPTION

Figure 1:
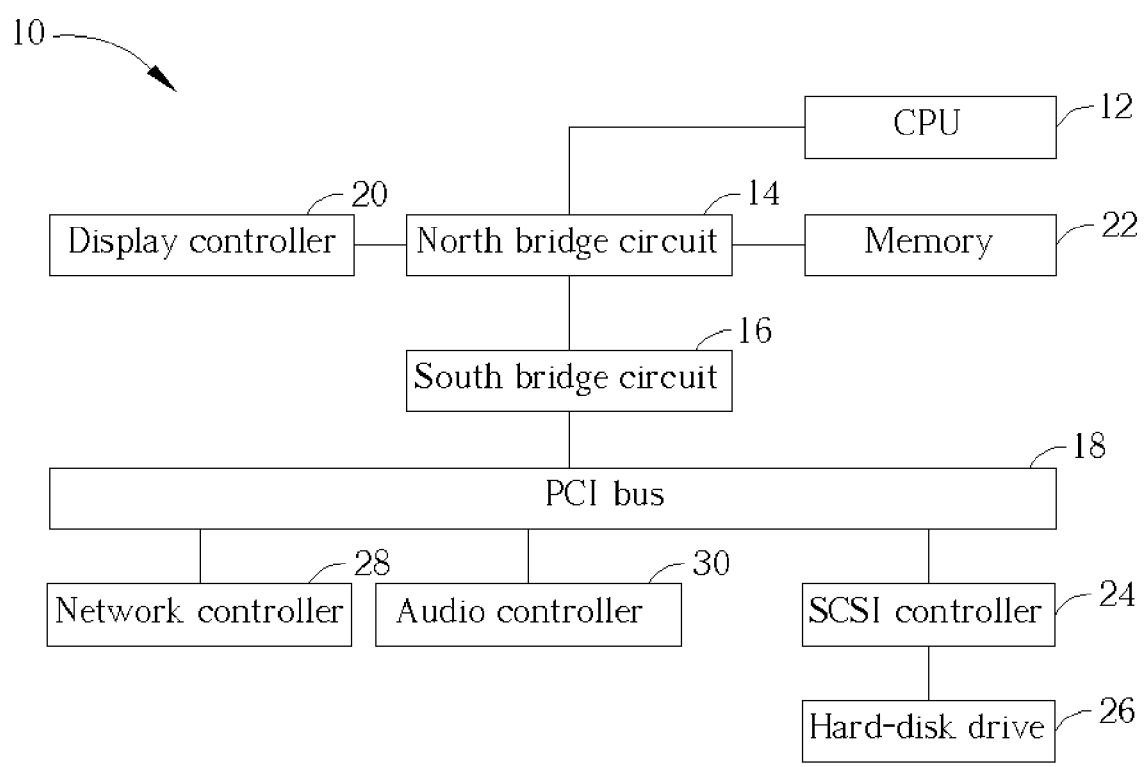
FIG. 1 is a diagram of a prior art computer system.
Figure 2:
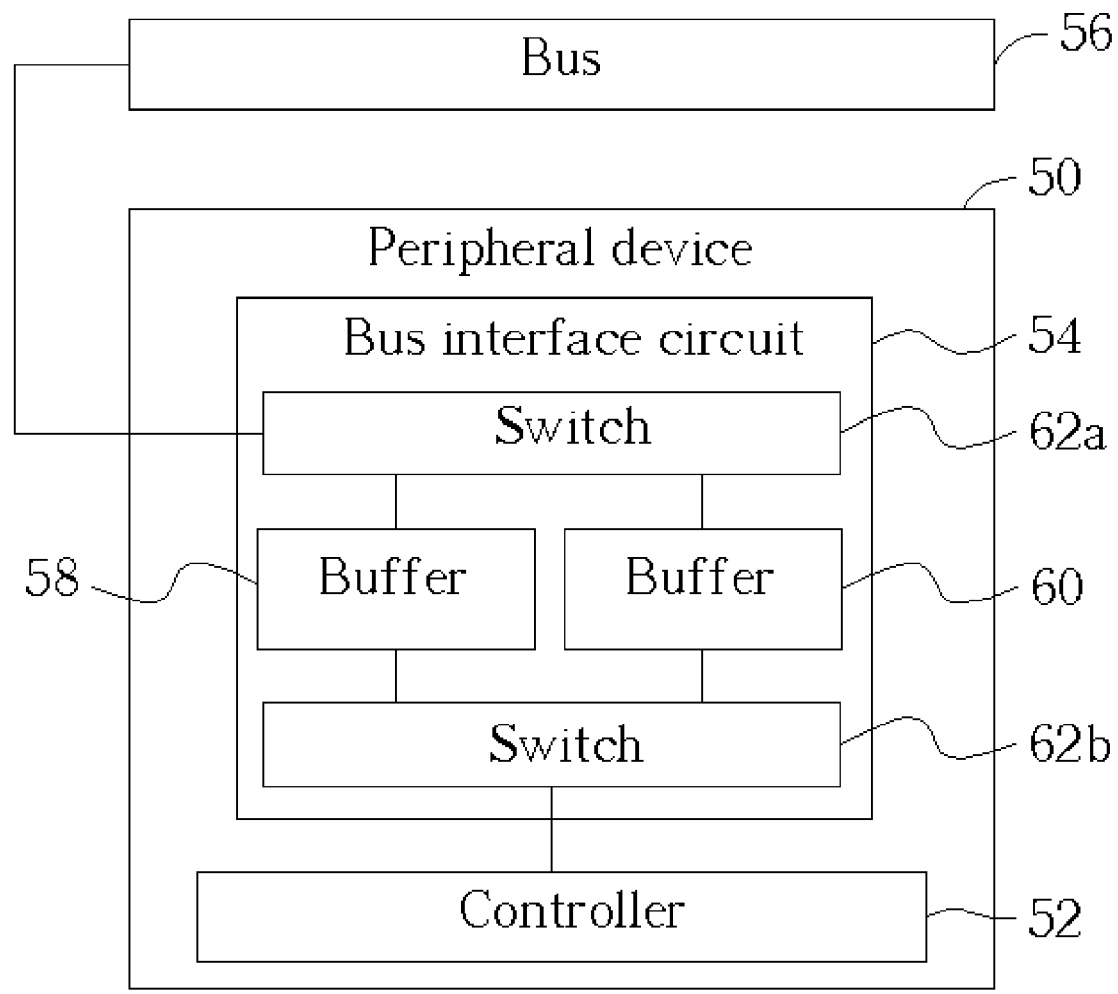
FIG. 2 is a block diagram of a peripheral device according to the present invention.

Please refer to FIG. 2, which is a block diagram of a peripheral device 50 according to the present invention. The peripheral device 50 includes a controller 52 and a bus interface circuit 54. The controller 52 is a kernel hardware component of the peripheral device, and is used for performing and controlling main functionality of the peripheral device 50. The bus interface circuit 54 is electrically connected to a corresponding bus 56, and functions as an input/output interface of the peripheral device 50. In addition, the bus interface circuit 54 has two buffers 58, 60 and two switches 62a, 62b. The peripheral device 50 according to the present invention is applied on the computer system 10 shown in FIG. 1, and is capable of being connected to any bus of the computer system 50. For instance, the peripheral device 50 can be connected to the PCI bus 18 shown in FIG. 1, the prior art industry standard architecture (ISA) bus, or the PCIX bus recently designed for high-speed data transmission. The peripheral device 50 can be any data-retrieving device such as an optical disk drive (not shown) or the network controller 28 shown in FIG. 1, the audio controller 30 shown in FIG. 1, or the hard-disk drive 26 shown in FIG. 1. In addition, the bus interface circuit 54 also can function as an SCSI interface. For example, the hard-disk drive 26 shown in FIG. 1 is connected to the SCSI controller 24 through the SCSI interface, and then accesses the PCI bus 18 for receiving and delivering data. Similarly, the bus interface circuit 54 can also function as a USB interface or an IEEE 1394 interface, and the PCI bus 18 shown in FIG. 1 can be accessed through a USB controller or an IEEE 1394 controller. In the preferred embodiment, the buffers 58, 60 operate according to a well-known first-in-first-out (FIFO) storage mechanism. That is, the data first pushed into the buffers 58, 60 are first popped out of the buffers 58, 60.

The switch 62a is used for determining which one of the buffers 58, 60 is electrically connected to the bus 56. When the buffer 58 is successfully connected to the bus 56, data stored in the buffer 56 can be passed to the bus 56. Similarly, when the buffer 60 is successfully connected to the bus 56, data stored in the buffer 60 can be passed to the bus 56. The switch 62b is used for controlling which one of the buffers 58, 60 is electrically connected to the controller 52. Therefore, when the controller 52 is successfully connected to the buffer 58 through the switch 62b, the controller 52 is capable of outputting data to the buffer 58 and storing data into the buffer 58. Similarly, when the controller 52 is successfully connected to the buffer 60 through the switch 62b, the controller 52 is capable of outputting data to the buffer 60 and storing data into the buffer 60.

Figure 3:
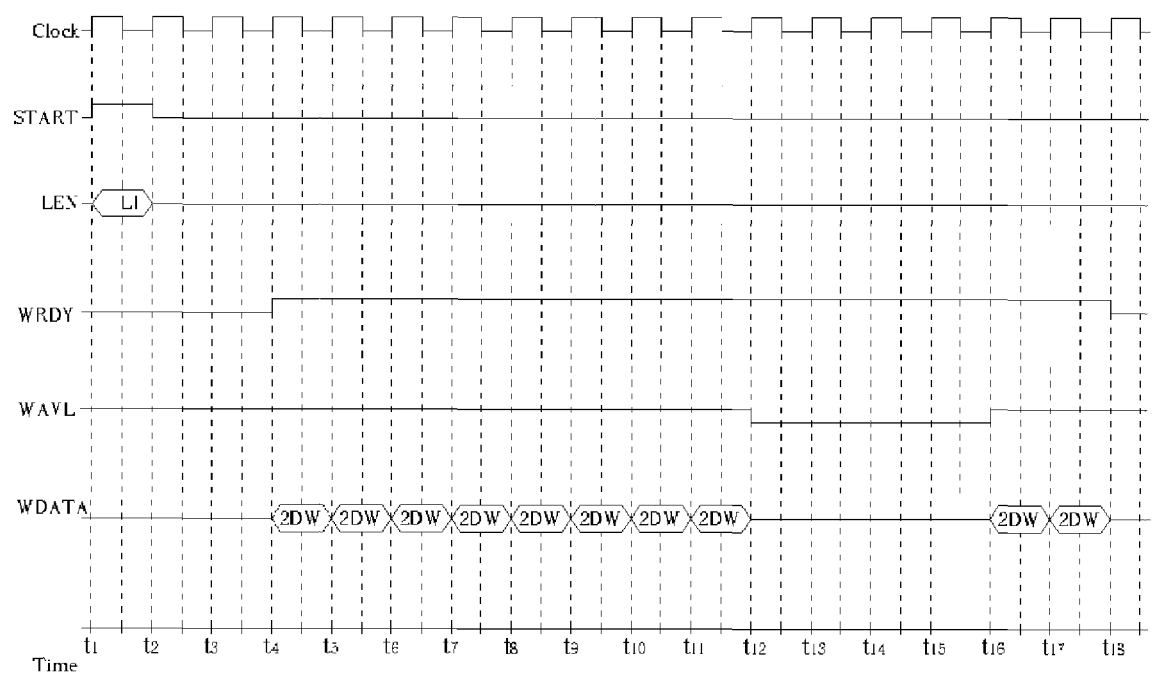
FIG. 3 is a timing diagram of the peripheral device shown in FIG. 2.

Please refer to FIG. 3, which is a timing diagram of the peripheral device 50 shown in FIG. 2. The horizontal axes listed from top to bottom correspond to a clock signal Clock, a control signal START, an information signal LEN, a control signal WRDY, a control signal WAVL, output data WDATA, and time Time. Suppose that each of the buffers 58, 60 has an identical capacity of 8 DWs, and the controller 52 wants to pass 20 DWs to a target device. For example, the peripheral device 50 is a network controller 28 shown in FIG. 1, and the target device is the memory 22 shown in FIG. 1. Therefore, the peripheral device 50 has to deliver data to the bus 56 (the PCI bus 18 shown in FIG. 1 for example) first, and then data are transferred to the target device with the help of the bus 56.

As mentioned above, the bus interface circuit 54 provides an input/output interface between the peripheral device 50 and the bus 56 so that the peripheral device 50 is capable of outputting data to the bus 56. In other words, the controller 52 first stores data into the buffers 58, 60 of the bus interface circuit 54. At time t1, the controller 52 outputs a control signal START to the bus interface circuit 54 for starting the data transaction between the controller 52 and the bus interface circuit 54. At the same time, the controller 52 also transfers an information signal LEN, which records the data length information LI, to the bus interface circuit 54 for informing the bus interface circuit of the amount of data involved in the data transaction. In the preferred embodiment, because the controller 52 wants to pass the data having 20 DWs to another device, the data length information LI is used to indicate that the amount of transmitted data contains 20 DWs.

In the beginning, the buffers 58, 60 are empty. Therefore, the bus interface circuit 54 outputs a control signal WAVL corresponding to the high logic level for informing the controller 52 that the buffers 58, 60 are capable of receiving data. At time t4, the controller 52 outputs a control signal WRDY corresponding to the high logic level to command the bus interface circuit 54 to start receiving data.

Suppose that the controller 52 can output two DWs to buffers 58, 60 during one period of the clock signal Clock, and each of the buffers 58, 60 can output one DWs to the bus 56 during one period of the clock signal Clock. In other words, the data transfer rate between the controller 52 and the bus interface circuit 54 is not less than the data transfer rate between the bus interface circuit 54 and the bus 56. The main purpose is to prevent the peripheral device 50 from entering a waiting state before the data transaction is completed. The detailed principle of the claimed mechanism is explained later.

When the control signal WRDY has a transition from the low logic level to the high logic level at time t4, the bus interface circuit 54 controls the switch 62b to select either the buffer 58 or the buffer 60 for storing data outputted from the controller 52. For example, the switch 62b is controlled to connect the buffer 58 and the controller 52 first. Therefore, the buffer 58 with a capacity of 8 DWs continuously receives 8 DWs outputted from the controller 52 within a duration t4–t8. Please note that the buffer 58 is full at time t8, but another buffer 60 is still empty to be capable of storing 8 DWs. Therefore, after the peripheral device 50 occupies the bus 56 to deliver data, the bus interface circuit 54 controls the switch 62a to connect the buffer 58 and the bus 56, and drives the buffer 58 to transfer its stored data (8 DWs) to the bus 56. At time t8, the controller 52 simultaneously commands the switch 62b to connect the buffer 60 and the controller 52 because controller 52 does not deliver all of the source data (20 DWs) to the bus interface circuit 54 yet. That is, the buffer 60 is further enabled to store data outputted from the controller 52.

Similarly, the buffer 60 has a capacity of 8 DWs. Therefore, the controller 52 needs 4 periods of the clock signal Clock to load the buffer 60 with 8 DWs. That is, the data transaction between the controller 52 and the buffer 60 is activated within a duration t8–t12. As mentioned above, each of the buffers 58, 60 is capable of outputting one DW only to the bus 56 during one period of the clock signal Clock. Therefore, the buffer 58 merely outputs 4 DWs during a duration t8–t12. At time t12, the buffer 58 still has 4 DWs so that all of its stored data are not completely transferred to the bus 56 yet. In other words, both of the buffers 58, 60 are unable to receive data after t12. Then, the bus interface circuit 54 resets the control signal WAVL at t12 to inform the controller 52 that the buffers 58, 60 cannot be used for storing data now.

It is obvious that the buffer 58 successfully transfers all of its stored data to the bus 56 at t16. That is, the buffer 58 outputs 8 DWs within the duration t8–t18. Because the buffer 58 is empty now, the buffer 58 can be used for storing data transmitted from the controller 52. Therefore, the bus interface circuit 54 triggers the control signal WAVL at t16 so that the control signal WAVL has a transition from the low logic level to the high logic level for informing the controller 52 that it can continue out-putting remaining data to the bus interface circuit 54. The controller 52 has to control the switch 62b to connect the buffer 58 and the controller 52 for utilizing the buffer 58 to receive data that are transferred from the controller 52 to the bus interface circuit 54. At the same time, the bus interface circuit 54 controls the switch 62a to connect the buffer 60 and the bus 56, and drives the buffer 60 to start outputting its stored data. Within the duration t4–t12, the controller 52 has transferred 16 DWs to the bus interface circuit 54. However, controller 52 actually wants to pass 20 DWs to another device through the bus 56. Therefore, the controller 52 needs to spend two periods of the clock signal Clock for outputting the remaining 4 DWs.

As shown in FIG. 6, the buffer 58 successfully stores 4 DWs at t18, and the data transaction between the controller 52 and the bus interface circuit 54 is completed. Therefore, the controller 52 resets the control signal WRDY at t18 so that the control signal WRDY has a transition from the high logic level to the low logic level for informing the bus interface circuit 54 that the data transaction is finished. Then, after the buffer 60 finishes outputting 8 DWs to the bus 56, the bus interface circuit 54 controls the switch 62a to connect the buffer 58 and the bus 56 for out-putting remaining 4 DWs currently stored in the buffer 58 to the bus 56. In other words, after the buffer 60 completes outputting its stored data to the bus 56 within 8 periods of the clock signal Clock, the bus interface circuit 54 continues controlling the buffer 58 to output remaining data stored in the buffer 58 to the bus 56 within 2 periods of the clock signal Clock.

When the buffer 60 receives data outputted from the controller 52 within the duration t8–t12, the buffer 58 simultaneously outputs its stored data to the bus 56. As mentioned before, the data transfer rate between the controller 52 and the bus interface circuit 54 is not less than the data transfer rate between the bus interface circuit 54 and the bus 56. Therefore, the buffer 58 does not output all of its stored data to the bus 56 before the buffer 60 is full. In other words, when the buffer 60 is full, the peripheral device 50 does not release the bus 56 because the buffer 58 is still outputting stored data through the bus 56. In the preferred embodiment, the peripheral device 50 does not enter the waiting state before the data transaction is finished. On the contrary, suppose that the data transfer rate between the controller 52 and the bus interface circuit 54 is less than the data transfer rate between the bus interface circuit 54 and the bus 56. Therefore, the buffer 58 outputs all of its stored data before the buffer 60 is fully loaded with data outputted from the controller 52. That is, the buffer 58 is empty, and the buffer 60 is not full yet.

It is well-known that the bus interface circuit 54 does not control the buffer 60 to output its stored data because the buffer 60 is not full. Therefore, before the buffer 60 is fully loaded with data, the peripheral device 50 has to enter the waiting state because the buffer 60 is unable to output its stored data. Other devices connected to the bus 56 have the chance to take over the bus 56 originally occupied by the peripheral device 50. In other words, when the buffer 60 of the peripheral device 50 stores 8 DWs after a period of time, the peripheral device 50 needs to wait until the bus 56 is available to the peripheral device 50.

After taking control of the bus 56 again, the peripheral device 50 then is capable of outputting the data stored in the buffer 60. From the above description, the data transfer rate between the controller 52 and the bus interface circuit 54 cannot be less than the data transfer rate between the bus interface circuit 54 and the bus 56. Therefore, while the controller 52 is outputting data to another device, the peripheral device 50 does not enter the waiting state, and is capable of utilizing the bus 56 continuously for completing the overall data delivery.

In the preferred embodiment, the buffer 58 and the buffer 60 has the same capacity. However, the buffers 58, 60 with different capacities can be implemented on the peripheral device 50 as well. For example, suppose that the capacity of the buffer 60 is twice as big as the capacity of the buffer 58. The period of time needed to drive the buffer 60 to have a full capacity is certainly less than the period of time needed to empty the buffer 58 originally having a full capacity as long as the data transfer rate between the controller 52 and the bus interface circuit 54 at least doubles the data transfer rate between the bus interface circuit 54 and the bus 56. In other words, when the peripheral device 50 utilizes the bus 56 to deliver data, the peripheral device 50 has better data processing performance because it does not enter the waiting state.

Figure 4:
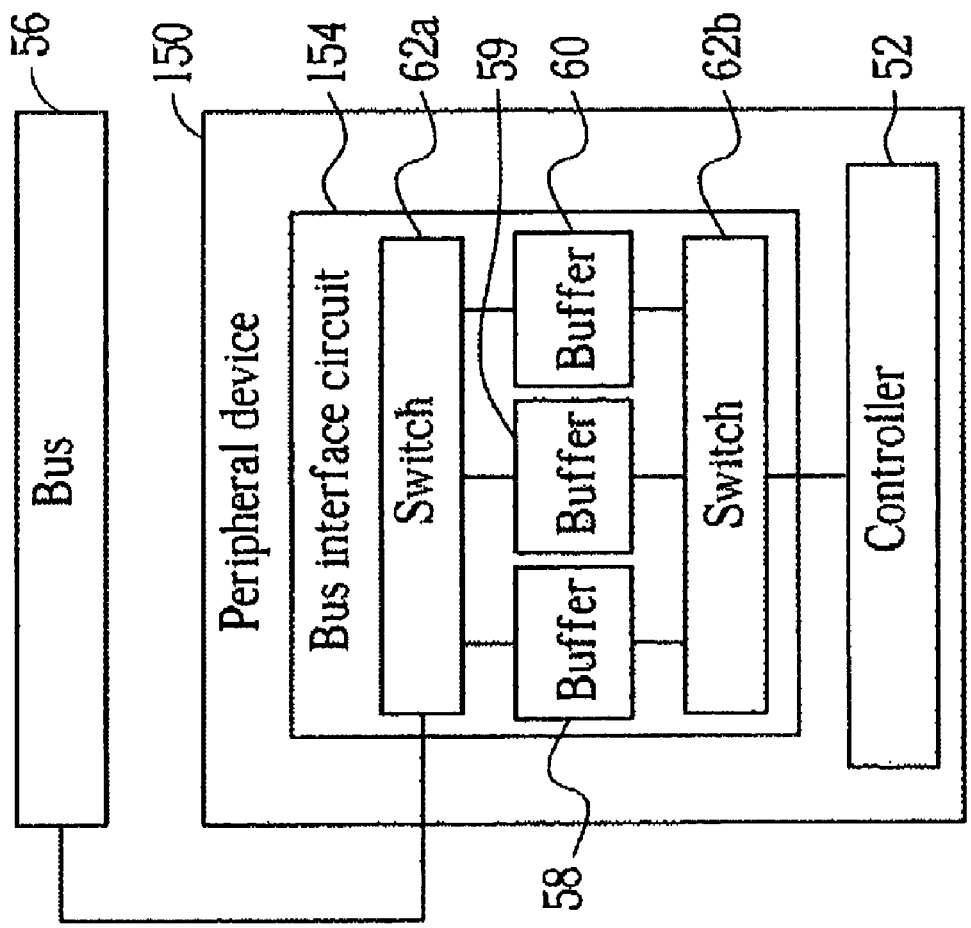
FIG. 4 is a block diagram of a peripheral device according to another embodiment of the present invention.

In order to prevent the peripheral device 50 from entering the waiting state, the preferred embodiment has to adequately determine capacities of the buffers 58, 60 according to the transfer rate between the controller 52 and the bus interface circuit 54 and the data transfer rate between the bus interface circuit 54 and the bus 56. In addition, the bus interface circuit 54 in the preferred embodiment only has two buffers 58, 60. However, a plurality of buffers can be applied on the bus interface circuit 54 to complete the data transaction. Please refer to FIG. 4, which is a block diagram of a peripheral device 150 according to another embodiment of the present invention. Differing from the peripheral device 50 shown in FIG. 2, the peripheral device 150 has a bus interface circuit 154 containing three buffers 58, 59, 60. All other features are the same, and the same components are indicated by the same reference numbers. Based on the above-mentioned operations, the bus interface circuit 54 successively activates these buffers 58, 59, 60 to store data delivered from the controller 52.

In the beginning, the bus interface circuit 54 enables the buffer 58 to store data outputted from the controller 52 until the buffer 58 is full. After the peripheral device 50 occupies the bus 56 successfully, the bus interface circuit 54 drives the buffer 58 to start outputting data to the bus 56, and simultaneously enables the buffer 59 to continuously receive data outputted from the controller 52. As mentioned above, the timing when the buffer 59 is fully loaded with data needs to be prior to the timing when the buffer 58 outputs all of its stored data for the sake of preventing the peripheral device 50 from entering the waiting state. That is, before the buffer 58 completes outputting all of its stored data, the buffer 59 must be fully loaded with data. When the buffer 59 is full, the remaining buffer 60 is still empty. Therefore, the bus interface circuit 54 can drive the buffer 60 to start receiving data outputted from the controller 52.

When the buffer 58 completes outputting all of its stored data, the bus interface circuit 54 drives the buffer 59, whose capacity is full, to start outputting its stored data. Similarly, the timing when the buffer 60 is fully loaded with data needs to be prior to the timing when the buffer 58 outputs all of its stored data for the sake of preventing the peripheral device 50 from entering the waiting state. That is, before the buffer 59 completes outputting all of its stored data, the buffer 60 needs to be fully loaded with data. When the buffer 60 is full, the available buffer 58 is empty. Therefore, the bus interface circuit 54 can drive the buffer 58 to start receiving data outputted from the controller 52. When the buffer 59 completes outputting all of its stored data, the bus interface circuit 54 drives the buffer 60, whose capacity is full, to start outputting stored data. The identical operations mentioned above are repeated, and the buffers A,B,C can be used for receiving data delivered from the controller 52 and outputting stored data to the bus 56 sequentially. In the end, the same objective of outputting data to the bus 56 through the peripheral device 50 is achieved.

The claimed method of controlling data outputted from the claimed peripheral device utilizes a plurality of buffers for alternatively storing source data waiting to be delivered to a target device. Concerning the claimed peripheral device, a data transfer rate between a controller and a bus interface circuit cannot be less than a data transfer rate between the bus interface circuit and an external bus. Therefore, before all of the source data are completely transferred to the external bus, the claimed peripheral device is capable of continuously occupying the external bus without entering a waiting state. In addition, the implemented buffer of the claimed peripheral device has a small capacity (64 DWs for example). The production cost of the buffers is reduced, and the chip size of the bus interface circuit is greatly shrunk. Moreover, the data transfer efficiency is also improved because the claimed peripheral device is blocked from entering the waiting state during the data transmission.

The invention claimed is:

1. A method of controlling data outputted from a peripheral device, the peripheral device being installed on a computer system, the peripheral device comprising a bus interface circuit and a controller, the bus interface circuit being electrically connected to a bus of the computer system for controlling data transmission between the peripheral device and the bus, the controller being electrically connected to the bus interface circuit, the method comprising:

positioning at least a first storage block and a second storage block in the bus interface circuit;

storing data outputted from the controller in the first storage block;

utilizing the bus interface circuit for simultaneously controlling the first storage block to transfer data stored in the first storage block to the bus and controlling the second storage block to store data outputted front the controller;

positioning a third storage block in the bus interface circuit; and before data stored in the first storage block are completely outputted to the bus, the bus interface circuit preventing the controller from transferring data to the bus interface circuit if the second and third storage blocks are full.

2. The method of claim 1 wherein a capacity of the first storage block is equal to a capacity of the second storage block and the third storage block.

3. The method of claim 1 wherein the bus is a PCI bus.

4. The method of claim 1 wherein the peripheral device is a data-retrieving device.

5. The method of claim 4 wherein the data-retrieving device is a network card, a hard-disk drive, or an optical disk drive.

6. The method of claim 1 wherein the first, second, and third storage blocks operate according to a first-in-first-out (FIFO) storage mechanism.

7. A computer system comprising:

a bus;

a peripheral device comprising a bus interface circuit electrically connected to the bus, the bus interface circuit having at least a first storage block, a second storage block, and a third storage block; and a controller electrically connected to the bus interface circuit for simultaneously controlling the first storage block to transfer data stored in the first storage block to the bus and for controlling the second storage block to store data outputted from the controller, wherein the data stored in the first storage block are completely outputted to the bus, the bus interface circuit prevents the controller from transferring data to the bus interface circuit if the second and third storage blocks are full.

8. The computer system of claim 7 wherein the bus interface circuit further comprises:

a first switch electrically connected to the bus, the first storage block, the second storage block, and the third storage block for selectively connecting the bus with either the first storage block, the second storage block, or the third storage block; and a second switch electrically connected to the bus, the first storage block, the second storage block, and the third storage block for selectively connecting the controller with either the first storage block, the second storage block, or the third storage block.

9. The computer system of claim 7 wherein a capacity of the first storage block is equal to a capacity of the second storage block and the third storage block.

10. The computer system of claim 7 wherein the bus is a PCI bus.

11. The computer system of claim 7 wherein the peripheral device is a data-retrieving device.

12. The computer system of claim 11 wherein the data-retrieving device is a network card, a hard-disk drive, or an optical disk drive.

13. The computer system of claim 7 wherein the first, second, and third storage blocks operate according to a first-in-first-out (FIFO) storage mechanism.

* * * * *